March 9, 1971     L. A. LEFORT     3,568,267
SEAT BELT BUCKLE CONSTRUCTION
Filed Aug. 2, 1968     3 Sheets-Sheet 1
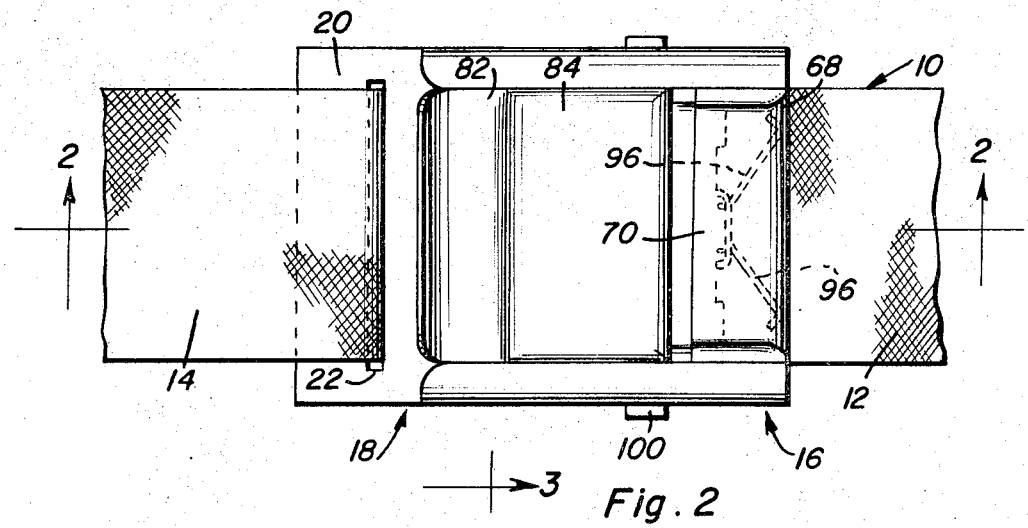
Fig. 1
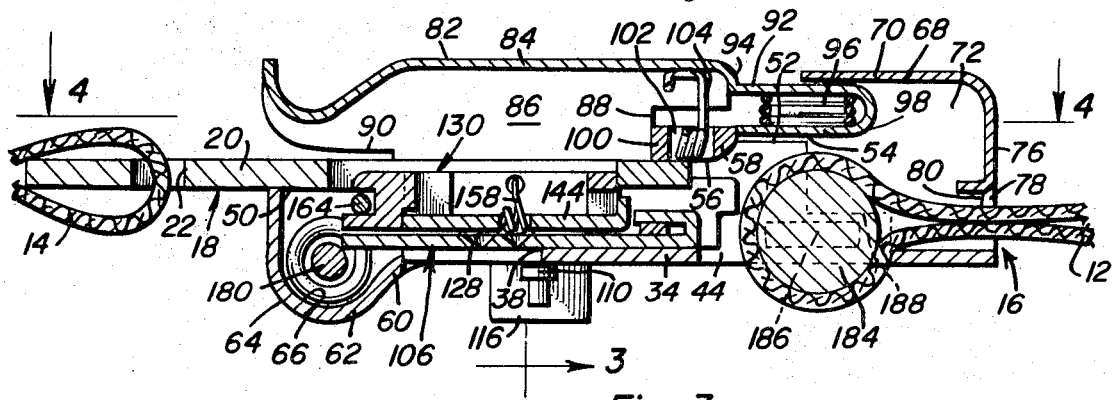
Fig. 2
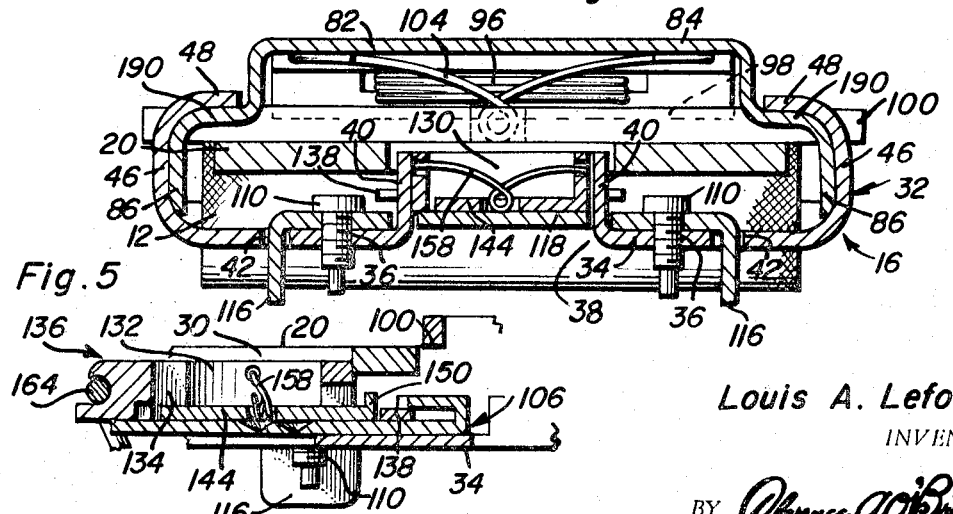
Fig. 3
Fig. 5
Louis A. Lefort
INVENTOR.
BY *Clarence A. O'Brien*
and *Harvey B. Jacobson*
Attorneys March 9, 1971  L. A. LEFORT  3,568,267
SEAT BELT BUCKLE CONSTRUCTION
Filed Aug. 2, 1968  3 Sheets-Sheet 2
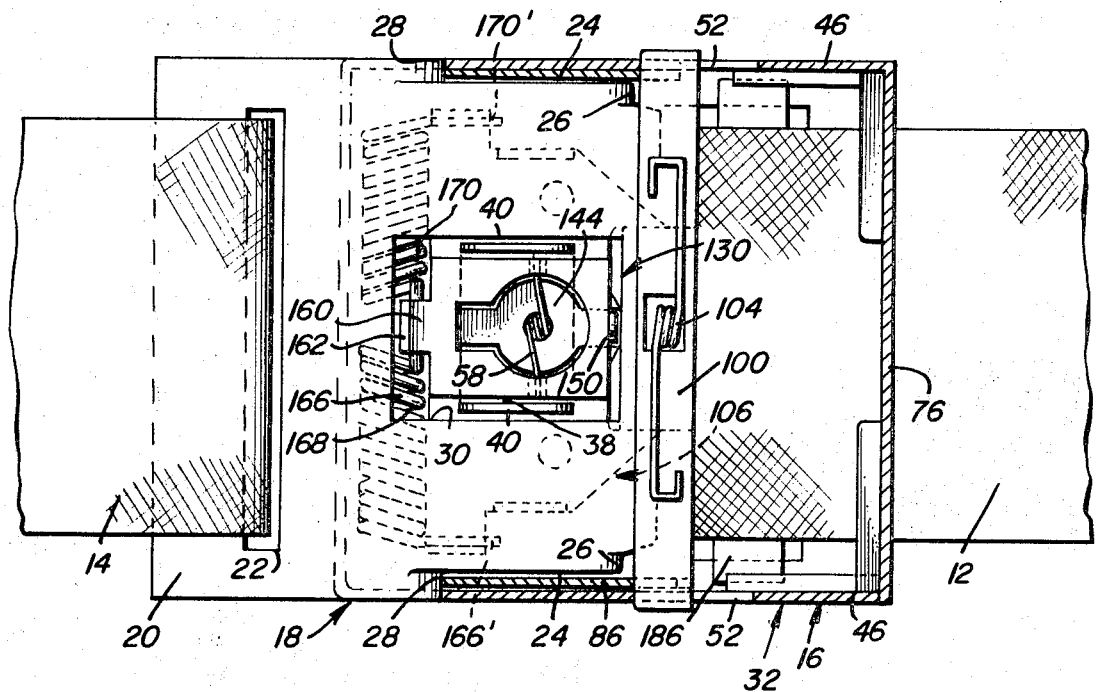
Fig. 4
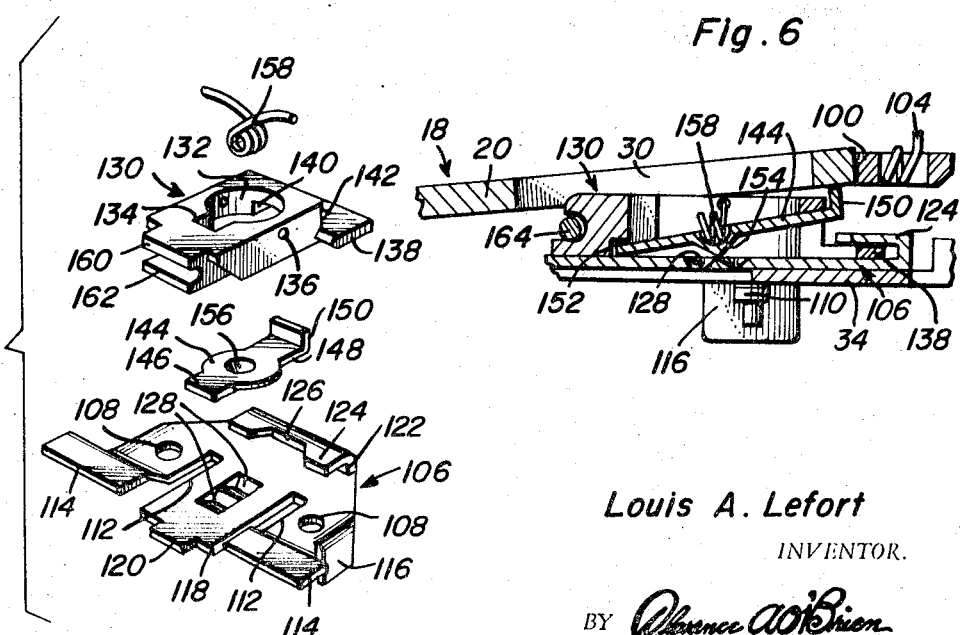
Fig. 7
Fig. 6
Louis A. Lefort
INVENTOR.
BY Clarence A. O'Brien
and Harvey B. Jacobson
Attorneys March 9, 1971   L. A. LEFORT   3,568,267
SEAT BELT BUCKLE CONSTRUCTION
Filed Aug. 2, 1968   3 Sheets-Sheet 3

Louis A. Lefort
INVENTOR.

BY *Clarence A. O'Brien*
*and Harvey B. Jacobson*
Attorneys

United States Patent Office 3,568,267
Patented Mar. 9, 1971

3,568,267
SEAT BELT BUCKLE CONSTRUCTION
Louis A. Lefort, 142 Beekman St.,
Plattsburgh, N.Y. 12901
Filed Aug. 2, 1968, Ser. No. 749,628
Int. Cl. A44b 11/25
U.S. Cl. 24—230                                        3 Claims

ABSTRACT OF THE DISCLOSURE

A pair of seat belt buckle sections for securement to adjacent ends of seat belt sections and manually releasably securable together against separation but including structure responsive to a force above a predetermined value being applied to separate the seat belt sections and subsequent termination of such force to release the seat belt buckle sections from interlocked engagement with each other for ready separation thereof.

---

While Federal law requires that seat belts be provided on all new automobiles and many drivers and occupants of automobiles fully appreciate that the utilization of seat belts tends to substantially reduce, and in some cases eliminate, injury incurred during accidents, it has become evident that an appreciable number of drivers and passengers hesitate to use seat belts because of the possibility of their not being able to quickly release their seat belts in the event of fire or other impending danger subsequent to an accident.

While some of these persons feel that the seat belt release mechanism might fail as a result of an accident and that they would therefore be prevented from getting out of a vehicle after an accident, others of these persons feel that they might be injured during an accident in a manner such that they would be unable to actuate the seat belt release mechanism, even though present seat belt release mechanisms are relatively easy to actuate.

The seat belt buckle construction of the instant invention is designed to eliminate these fears of being trapped in a vehicle after an accident and includes means by which the two sections of the buckle construction are automatically released from anchored engagement with each other in response to a force above a predetermined value being applied to the seat belt buckle sections to separate the latter and subsequent termination of such applied force. By this type of operation, the inertia of a person's body restrained by a seat belt constructed in accordance with the present invention during an accident will apply sufficient force to the buckle construction so as to "set" or "cock" the seat belt buckle construction for ready release as soon as initial impact of the accident has been terminated and therefore the above-mentioned persons fearful of not being able to readily release themselves from conventional seat belts will be willing to wear seat belts constructed in accordance with the present invention after having been educated as to the improved operation thereof.

The main object of this invention is to provide a seat belt buckle construction for incorporation into the manufacture of vehicle seat belts and including means operative to automatically release the two sections thereof releasably engageable with each other automatically upon the associated seat belt resisting inertia of a passenger during initial impact encountered as a result of an accident.

Another object of this invention is to provide a seat belt buckle construction in accordance with the preceding object and constructed in a manner whereby it may be readily incorporated into the manufacture of conventional types of seat belt assemblies.

Yet another object of this invention is to provide a seat belt buckle construction including means whereby the buckle sections thereof may be readily manually disengaged from each other with ease at the will of the wearer.

Another object of this invention is to provide a seat belt buckle construction in accordance with the preceding objects and including various components thereof which may be readily assembled.

A final object of this invention to be specifically enumerated herein is to provide a seat belt buckle construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary plan view of a seat belt construction utilizing the buckle construction of the instant invention;

FIG. 2 is an enlarged fragmentary vertical sectional view taken substantially upon the plane indicated by the section line 2—2 of FIG. 1;

FIG. 3 is a vertical sectional view taken substantially upon the plane indicated by the section line 3—3 of FIG. 2;

FIG. 4 is a horizontal sectional view taken substantially upon the plane indicated by the section line 4—4 of FIG. 2;

FIGS. 5 and 6 are fragmentary vertical sectional views taken substantially upon the plane indicated by the section line 2—2 of FIG. 1 and with the automatically releasing components of the seat belt buckle construction in different positions of operation;

FIG. 7 is an exploded perspective view of four of the working components of one of the seat belt buckle sections;

Figure 8:
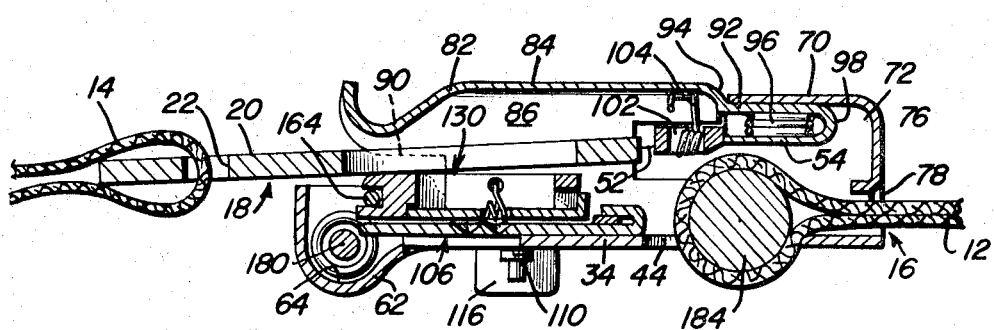
FIG. 8 is a view similar to FIG. 2 but illustrating a manual release of the seat belt construction.
Figure 9:
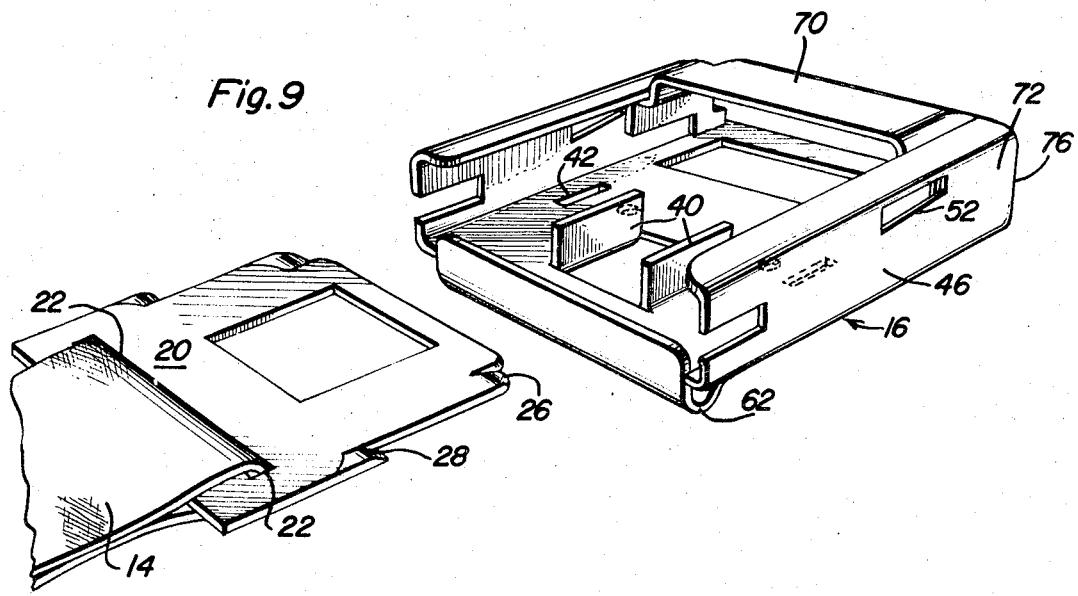
FIG. 9 is an exploded perspective view of the seat belt construction with all of the removable components of buckle housing portion removed.

Referring now more specifically to the drawings, the numeral 10 generally designates a seat belt construction including a pair of seat belt sections 12 and 14 with adjacent ends having seat belt buckle sections referred to in general by the reference numerals 16 and 18, respectively, secured thereto.

The seat belt buckle section 18 comprises a plate-like member 20 including a transverse slot 22 formed in one end thereof through which the seat belt section 14 is secured. The other end of the panel-like member 20 is reduced in transverse dimension as at 24, see FIG. 4, and includes forwardly and downwardly curved surfaces 26 and 28 on its opposite sides as well as a slightly longitudinally elongated and centrally disposed opening 30 formed therethrough.

The seat belt buckle section 16 includes an elongated case referred to in general by the reference numeral 32 including a bottom wall 34 having threaded mounting apertures 36 formed therethrough and a central opening 38 formed therein by means of lateral displacement of a pair of mounting ears 40 deflected upwardly from and formed integrally with the bottom wall 34. In addition, the bottom wall 34 has a pair of slots 42 formed therein.

The case 32 defines an end-wise opening recess 43 in which the section 18 is endwise insertable.

In addition to the opening 38, the bottom wall 34 includes an opening 44 formed therethrough which extends almost the entire distance between the upwardly curving opposite side wall portions of the case 32 which are formed integrally with the bottom wall 34 and terminate upwardly in inturned generally horizontal flange portions 48. Further, the forward ends of the side wall portions 46 are notched as at 50, see FIG. 2, for cooperation with the rounded surfaces 28 of the seat belt buckle section 18. Also, the side wall portions 46 have openings 52 formed therein including rear portions 54 and forward portions 56 with inclined ramp surfaces 58 extending between the lower marginal edges of the rear and front portions of the openings 52. Still further, the forward end portion of the bottom wall 34 curves downwardly as at 60, forwardly as at 62, and upwardly as at 64 to define an upwardly opening channel 66.

A stationary rear upper wall defining member 68 is provided and includes an upper wall defining portion 70 including downwardly curving opposite side wall portions 72 and a downwardly curving rear wall portion 76. The member 68 is slidable rearwardly into the case 32 between the side wall portions 46 and beneath the flange portions 48 and is limited in rearward positioning within the case 32 by means of laterally inwardly struck tongues 78 carried by the side wall portions 46 which are seatable in opposite side rearwardly opening notches 80 formed in the side wall portions 72.

A slide member 82 is also provided and includes an upper wall defining portion 84 which includes downwardly curving opposite side wall portions 86 including rearwardly opening notches 88 registerable with the openings 52 and forwardly opening notches 90 registered with the notches 50. The upper wall defining portion 84 includes a downwardly depressed forward end portion 92 receivable beneath the upper wall defining portion 70 and defining a rearwardly facing abutment surface 94 engageable with the forward edge portion of the upper wall defining portion 70 to limit rearward movement of the slide 82. Further, the rear end of the slide 82 includes a butterfly spring 96 whose free ends abuttingly engage the opposite side upper marginal portions of the rear wall portion 76 to urge the slide 82 toward its forwardmost limit position defined by engagement of the forward marginal edge portion of a lower flange 98 carried by the depressed portion 92 with a transversely extending locking bar 100 whose opposite ends are held captive in the openings 52.

After the member 68 has been positioned within the case 32 and the slide 82 has been slid rearwardly into the case 32, the locking bar 100 is lengthwise inserted into the case 32 through the forward portions 56 of the openings 52. In addition, the central portion of the locking bar 100 includes a vertical opening 102 in which the center coiled portion of a second butterfly spring 104 is received, the arms or wings of the butterfly spring 104 bearing upwardly against the upper wall defining portion 84 of the slide 82 and thus enabling the root ends of the wings of the spring 104 to urge downwardly upon the locking bar 100 so as to serve to yieldingly retain the locking bar 100 in the lower forward portions 56 of the openings 52.

With attention now invited more specifically to FIGS. 3, 4 and 7, there may be seen a retaining plate referred to in general by the reference numeral 106 including apertures 108 formed therethrough through which fasteners 110 are passed and threadedly engaged in the threaded apertures or bores 36 to retain the plate 106 mounted upon the bottom wall 34 of the case 32. The plate 106 includes a pair of slots 112 upwardly through which the mounting ears 40 project and a pair of upwardly offset opposite side forward retaining tabs 114. In addition, the retaining plate 106 includes a pair of opposite side downturned ears 116 which are received downwardly through the slots 42 and which may be bent back under the bottom wall 34 to further secure the plate 106 to the bottom wall 34. In actual practice, the fasteners 110 and apertures 36 and 108 are not needed for assembly of the retaining plate 106 to the botom wall 34 inasmuch as the downturned ears 116, when bent toward each other under the bottom wall 34, are sufficient to retain the retaining plate 106 securely fastened to the bottom wall 34.

The retaining plate 106 defines a forwardly projecting tongue 118 between the slots 112 and the free end of the tongue 118 includes a transversely reduced extension 120. Further, the rear end of the retaining plate 106 includes an upturned flange portion 122 which terminates upwardly in a forwardly directed flange portion 124 notched as at 126 intermediate its opposite ends. Also, the tongue 18 includes a pair of longitudinally spaced upwardly opening V-shaped cam recesses 128.

A locking block referred to in general by the reference numeral 130 is provided and includes a centrally disposed upstanding opening 132 formed therethrough provided with a forwardly projecting extension 134. The locking block 130 is received between the mounting ears 40 and includes opposite side transverse bores 136 which lie on the same diameter of the opening 132 and open into the latter at adjacent ends. Further, the locking block 130 includes a rearwardly projecting bottom tongue portion 138, see FIG. 7, which is held captive beneath the flange portion 124 and the rear underside of the locking block 130 is relieved as at 140. Further, the center portion of the tongue portion 138 has an opening 142 formed therethrough and a cam plate 144 including a forwardly directed horizontal tongue portion 146 and a rearwardly directed tongue portion 148 terminating rearwardly in an upwardly directed tab 150 is slidable relative to the locking block 130 between forward and rearward limit positions defined by the forward extremity of the extension 134 which is undercut as at 152 and a rear limit position defined by engagement of the rear face of the tab 150 with the notch 126 or rear extremity of the opening 142. The central portion of the cam plate 144 includes a downwardly depressed cam element 154 and an upwardly opening recess 156 and the coiled portion of a third butterfly spring 158 is seated in the recess 156 with the free ends of the wings of the spring 158 seated in the transverse bores 136 formed in the locking block 130.

The forward end of the locking block 130 includes an extension 160 which is of reduced transverse width and has a horizontally disposed forwardly opening groove 162 formed therein. The portion of the extension 160 defining the lower extremity of the groove 162 overlies the extension 120 and a generally U-shaped portion 164 of a torsion spring 166 having oppositely wound opposite end portions 168 and 170 has its bight portion seated in the groove 162. The end portions 168 and 170 of the spring 166 receive the opposite ends of a retaining pin 180 therethrough and the remote ends of the oppositely coiled end portions 168 and 170 project rearwardly as at 166' and 170' and are secured beneath the remote ends of the retaining tabs 114 of the retaining plate 106.

In assembly, the components illustrated in FIG. 7 of the drawings including the pin 180 and the spring 166 may be assembled to the bottom wall 34 in a manner believed to be obvious from the previous description. Thereafter, the member 68 may be slid rearwardly in the case 32 and seated in its rearmost position. Thereafter, a retaining shaft 184 including flat opposite end endwise outwardly projecting extensions 186 may be inserted into the case 32 through the opening 44 with the extensions 186 overlying the opposite side marginal edge portions of the bottom wall 34 disposed at opposite sides of the opening 44 and underlying the forward notched portions 188 of the side wall portions 72, see FIG. 2. Thereafter, the seat belt section 12 may be secured about the shaft 184 and the seat belt section 14 may be secured through the slot 22. Then, the slide 82 is rearwardly displaced into the case 32 and urged slightly rearwardly against the biasing action of the butterfly spring 96 so that the forwardmost extremity of the rearwardly opening notches 88 of the side wall portions 86 of the slide 82 register with the forwardmost extremities of the openings 52 formed in the side wall portions 46 of the case 32. Thereafter, the central coiled portion of the butterfly spring 104 is seated in the opening 102 formed in the locking bar 100 and one end of the locking bar 100 is endwise advanced through one of the openings 52 while the free end of the corresponding wing or leg of the butterfly spring 104 is urged downwardly upon the first inserted end of the locking bar 100. After the locking bar 100 has been half way inserted through the first opening 102, the butterfly spring 104 then has its other wing urged downwardly upon the other end of the locking bar 100 and the latter is further inserted through the opening 52 until the first inserted end of the locking bar 100 is received in the other opening 52. After the locking bar 100 and spring 104 have been inserted, the free ends of the wings of the spring 104 and the interlocked engagement of the coiled portion of the spring 104 with the opening 102 formed in the locking bar 100 prevent longitudinal shifting of the locking bar 100 by their engagement with the downwardly curving opposite side portions of the upper wall defining portion 84 of the slide 82 until a suitable tool is inserted rearwardly into the rear end of the slide 82 to downwardly depress the free end of one of the wings of the spring 104 so as to bring it into registry with the associated opening 52 preparatory to lengthwise removal of the locking bar 100.

After the locking bar 100 has been inserted, the seat belt buckle construction including the seat belt buckle sections 16 and 18 are ready for operation. When it is desired to lock the seat belt buckle section 18 to the section 16, the transversely reduced end of the member 20 is inserted rearwardly into the open forward end of the slide 82 with the first inserted end of the member 20 in a slightly upwardly inclined position. Then, as the first inserted end of the member 20 engages the locking bar 100, the latter will be displaced upwardly and rearwardly against the biasing action of the spring 104 and the portion of the member 20 having the opening 30 formed therein may then be displaced rearwardly until it slips down over the upper portion of the locking block 130. At this point the spring 96 will urge the rearwardly displaced slide 82 and the locking bar 100 forwardly so as to position the locking bar 100 over the first inserted end of the member 20 in the manner illustrated in FIG. 3 of the drawings. Thereafter, if it is desired to manually release the seat belt buckle sections 16 and 18 the forward end of the slide 82 is engaged and displaced rearwardly whereupon the forward extremities of the notches 88 will engage the opposite ends of the locking bar 100 so as to rearwardly and upwardly displace the latter rearwardly of the first inserted end of the member 20 thereby freeing the latter for upward displacement out of engagement with the locking block 130 and forward withdrawal through the forward end of the case 32. Therefore, it may be seen that the seat belt buckle section 18 may be readily manually disengaged from the seat belt buckle section 16.

When sudden deceleration of the vehicle in which the seat belt construction 10 is supported occurs, the person restrained by the seat belt assembly 10, by inertia, causes a large force to be exerted on the seat belt construction 10 tending to separate the seat belt buckle section 18 from the seat belt buckle section 16. This force, if sufficient to overcome the biasing action of the spring 166, causes the locking body 130 to shift forwardly to the position thereof illustrated in FIG. 5 of the drawings with the cam element 154 riding up over the forward bottom surface of the rear recess 128 and seating in the bottom of the front or forward recess 128. Rearward movement of the locking body 130 is caused by the portion of the member 20 defining the forwardmost extremity of the opening 30 bearing against the rear vertical face of the locking body 130, forward movement of the latter imparting forward movement to the cam plate 144 through the spring 158. At the forwardmost point of travel of the locking body 130 the forward extremity of the opening 30 contacts the rear upstanding edges of the mounting ears 140 and the first inserted end edge of the member 20 has been shifted forwardly from beneath the locking bar 100. Then, as the initial impact or deceleration of the vehicle is terminated and the tension on the belt sections 12 and 14 is lessened, the spring 166 will urge the locking body 130 rearwardly with the result that the slight play or slack between the cam plate 144 and the locking body 130 will position the tongue portion 146 of the cam plate 144 in the undercut portion 152 of the locking body 130 thereby preventing upward movement of the tongue portion 146 as the cam element 154 rides upwardly over the rear bottom surface of the forward recess 128. Since the forward tongue portion 146 cannot be elevated, the rear tongue portion 148 is elevated in the manner illustrated in FIG. 6 of the drawings and the tab 150 engages that portion of the member 20 disposed forwardly of the opening 30 and urges the first inserted edge portion of the member 20 upwardly so that its rear edge will engage the forward face of the locking bar 100 and prevent continued rearward movement of the member 20 with the locking body 130, the portion of the member 20 disposed forward of the opening 30 being elevated above the upper surface of the locking body 130. At this point, the member 20 is free of engagement with the locking body 130 and may be readily pulled forwardly through the case 32 for disengagement from the latter, the curved surfaces 26 and 28 serving to prevent galling between the member 20 and the opposite side horizontal flange portions 190 of the slide 82 disposed below the flange portions 48 of the case 32.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A seat belt buckle construction including first and second elongated end members including base ends for securement to adjacent ends of a pair of seat belt sections and free ends releasably engageable with each other, the free end of said first end member defining an endwise outwardly opening recess and the free end of the second end member defining a flat tongue insertable in said recess, said tongue having an opening formed therethrough and said first end member defining a locking block projecting laterally into said recess from one side thereof and over which said tongue is laterally displaceable in one direction with said block received in said opening upon full insertion of said tongue into said recess to lock said tongue in said recess, a locking bar extending transversely of the other side of the inner end of said recess and supported from said first end member for guided lateral shifting longitudinally of said first end member between first and second limit positions shifted toward and away from the open end of said recess, respectively, first means yieldingly biasing said bar toward its first position, said block being supported from said first end member for guided shifting longitudinally of the latter between first and second positions shifted toward and away from the open end of said recess, respectively, second means yieldingly biasing said block toward its second position, said bar, when said tongue is engaged with said block and said block and bar are in their first and second positions, respectively, overlying the side of the free terminal end of said tongue on the other side of said recess to prevent its lateral displacement in the other direction, said free terminal end of said tongue, when said block is shifted to an intermediate position of its movement, being displaced from beneath said bar, said block and first end member including coacting cam means for camming said terminal end in the opposite direction in response to said block being shifted from its second position, past said intermediate position and then back to said intermediate position, said terminal end of said tongue, when laterally cammed in said opposite direction, being disposed for endwise abutment with said bar and displaced toward the other side of said recess.

2. The combination of claim 1 wherein said first end member includes means manually operable from the exterior thereof for shifting said bar to its second position.

3. The combination of claim 2 wherein said bar and first end member include coacting means operable to shift said bar laterally toward the other side of said recess in response to movement of said bar to its second position.

References Cited

UNITED STATES PATENTS

| | | | |
|---|---|---|---|
| 3,130,466 | 4/1964 | Carter | 24—230.1KUX |
| 3,142,102 | 7/1964 | Saunders | 24—230.1PUX |
| 3,235,930 | 2/1966 | Chapin | 24—230.1UX |
| 3,237,265 | 3/1966 | Florian | 24—230.1UX |
| 3,238,587 | 3/1966 | Goinard | 24—230.1UX |
| 3,270,387 | 9/1966 | Ziegler | 24—230.1MUX |

BERNARD A. GELAK, Primary Examiner